APPARATUS FOR CRYOGENIC REFRIGERATION

Filed March 27, 1961 2 Sheets-Sheet 1

INVENTORS
JAMES L. ABERLE
RICHARD J. FRAINIER
HUGH M. LONG

BY William F. Mesinger
ATTORNEY

APPARATUS FOR CRYOGENIC REFRIGERATION

Filed March 27, 1961 2 Sheets-Sheet 2

INVENTORS
JAMES L. ABERLE
RICHARD J. FRAINIER
HUGH M. LONG

BY William F. Moringer
ATTORNEY 3,122,004
APPARATUS FOR CRYOGENIC REFRIGERATION
James L. Aberle, Richard J. Frainier, and Hugh M. Long, Tonawanda, N.Y., assignors to Union Carbide Corporation, a corporation of New York
Filed Mar. 27, 1961, Ser. No. 98,601
7 Claims. (Cl. 62—259)

This invention relates to an apparatus for refrigerating small components. In particular, this invention relates to a system for refrigerating small components in a double-walled, vacuum-insulated portable container.

Refrigerating small components by maintaining them at temperatures below 100° K. and in an environment separate from that of the refrigerant has become increasingly important. The maintenance of such low temperatures is particularly useful in the field of cryo-electronics. Certain electronic equipment, such as infrared detection cells and masers, have been found to operate much more effectively at temperatures near the temperature of liquefied helium at atmospheric pressure. This is especially true concerning "microwave amplification by stimulated emission of radiation" (maser) micro-wave transmission systems wherein the amplifier pickup unit in the antennae is preferably refrigerated at these temperatures in order to improve its sensitivity.

Attempts of the prior art to solve the problems involved in refrigerating small components at such low temperatures have generally resulted in one or the other of two systems. The first comprises the immersion of the small component directly in the refrigerant. Insofar as the amplifier pickup unit of the maser system is concerned, this is objectionable in that the increased noise level caused by the boiling refrigerant seriously impairs the usefulness of the electronic detector circuit. The second system employed by the prior art comprises placing a small component within the insulation space of a double-walled low-boiling liquefied gas storage container and refrigerating the component by thermal conduction from the inner refrigerant vessel. This type of installation is permanent in nature and hence objectionable from the standpoint of accessibility and ease of repair and replacement.

Figures 1, 1A:
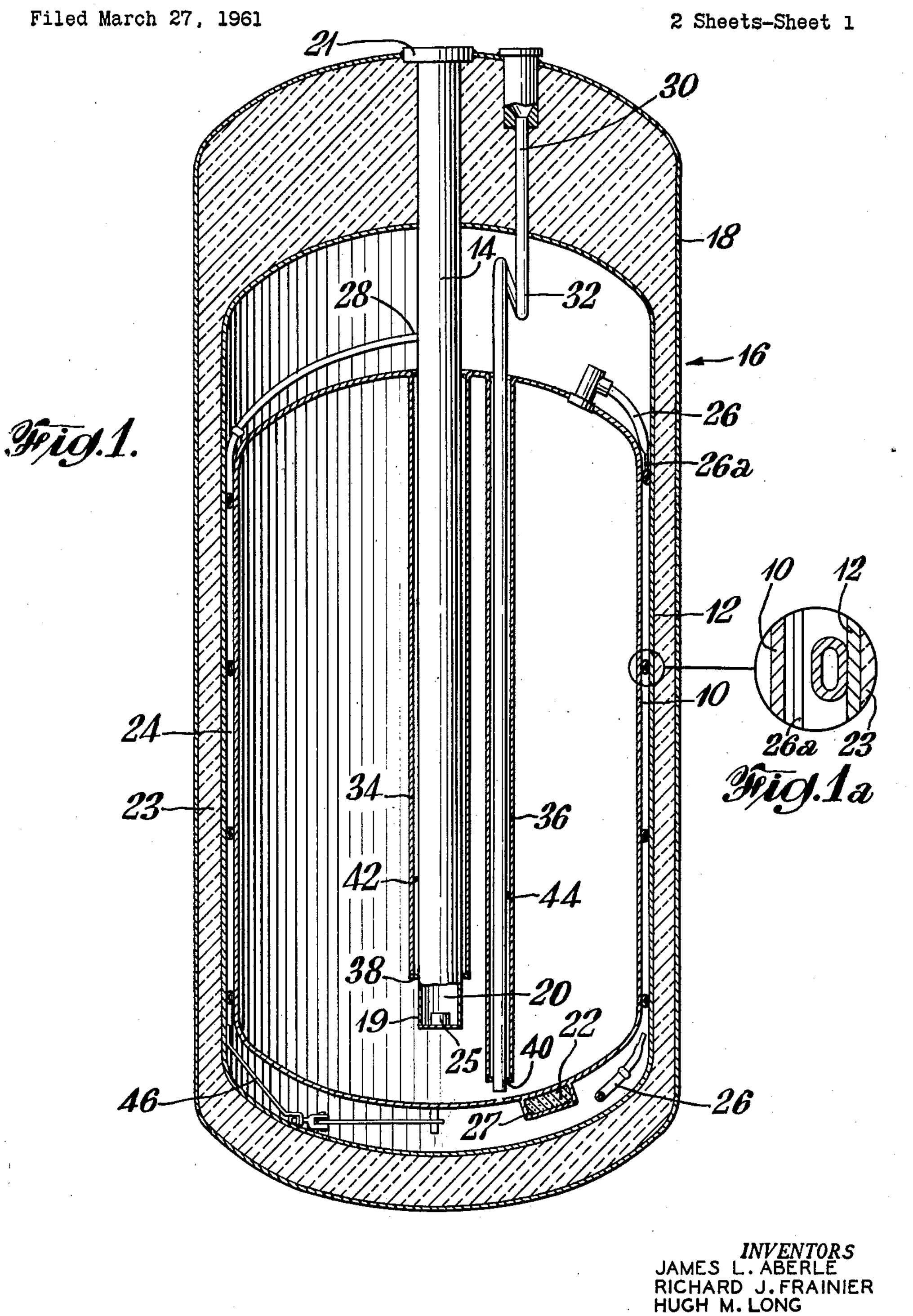

It is therefore an object of this invention to provide means for refrigerating a small component at very low temperatures by providing such component in indirect heat exchange relationship with a low-boiling liquefied gas. A further object is to refrigerate a small component at temperatures below about 100° K. in a double-walled, vacuum-insulated storage container in a manner such that the small component is readily accessible from the exterior of such container. These and other objects and advantages of the present invention will become apparent from the following description and the accompanying drawings in which:

FIGURE 1 is a longitudinal view, partially in cross-section, of a container embodying features of the present invention.

FIGURE 1*a* is an exploded view, partially in cross-section, of a portion of the embodiment of FIGURE 1.

Figure 2:
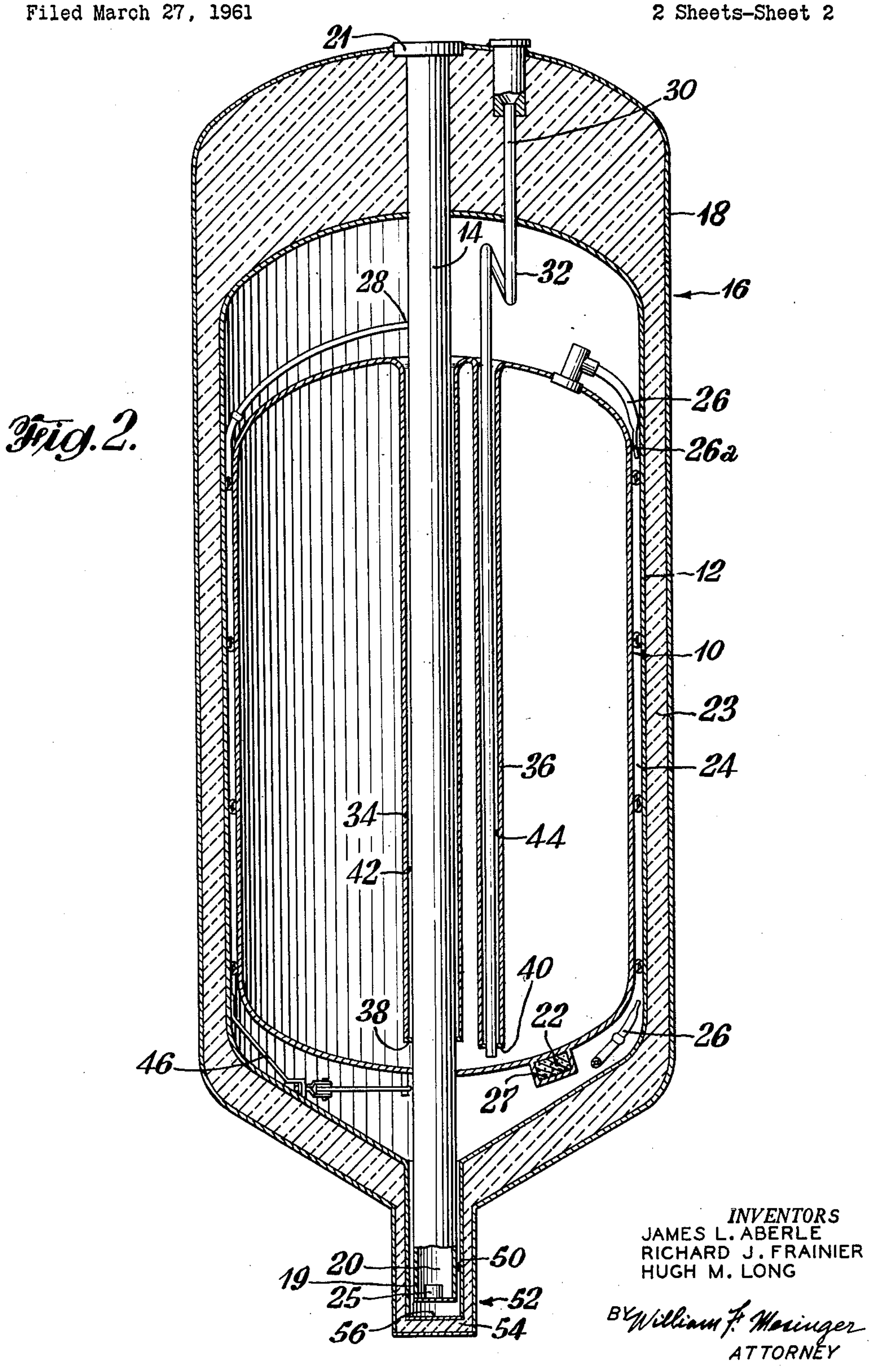

FIGURE 2 is a longitudinal view, partially in cross-section, embodying additional features of the present invention.

Although the invention will be specifically described in terms of a system for refrigerating small components by providing a stored body of liquefied helium in indirect heat exchange relationship therewith, it is to be understood that the invention is also suitable if other low-boiling liquefied gases having boiling points below about 100° K. at atmospheric pressure may be employed such as hydrogen, neon, nitrogen, argon, and oxygen.

The operation of the electrical circuit required for a maser crystal, for example, will generate a significant amount of heat relative to the total heat input into the liquid refrigerant. Also, the crystal must be connected to the rest of the circuit through electrical conduits which provide another means of heat in leakage. Of necessity, this heat must be transferred from the refrigerated space within which the crystal is placed into the liquefied helium body. Consequently, extreme measures are required to limit the amount of ambient heat that will leak into the liquefied helium body in order that the helium refrigerant will be utilized in the most efficient manner and thus conserve the liquid refrigerant. Furthermore, if relatively long periods of "untouched" operation are called for, the liquefied helium must be initially supplied in sufficient quantities to adequately refrigerate the small component throughout the entire operation period.

Very low-boiling gases such as helium and hydrogen are extremely difficult to store conveniently in rather substantial quantities, e.g. 100 liters or more, within a portable container. For example, the heat required to vaporize 1 liter of liquid helium is approximately 3 B.t.u., or about 1% of the heat required to vaporize 1 liter of liquid oxygen. Consequently, extreme care must be taken to minimize the amount of heat leakage through the container into the liquid helium refrigerant. This is achieved in the present invention by employing an elongated low heat-conductive support system and a high quality insulation system.

It is not possible to completely eliminate the atmospheric heat leak into a container. Therefore, the present invention utilizes the vapor produced by the total heat input, which may comprise internally generated heat as well as atmospheric heat leak, to intercept the major portion of the ambient heat leak and thus provide a portable container of minimum size. Heat leak by conduction and radiation has been minimized by providing a double-walled vacuum-insulated liquefied gas storage container wherein a vapor-refrigerated metal thermal shield is situated between the outer shell and the inner liquefied gas storage vessel.

An opacified insulating material is preferably placed between the outer shell and the inner vessel thereby substantially reducing the amount of heat leakage due to conduction and radiation that will pass through the inner enclosure formed by the thermal shield and the inner vessel. The thermal shield is located such that the total heat leakage from it to the inner vessel comprising solid and gaseous heat conduction and radiant heat is quite small. The liquefied helium vaporized by the heat passing through this inner enclosure and any heat generated by the circuitry associated with the small component is conducted, in heat exchange relationship with the thermal shield, out of the container into the surrounding atmosphere. Such vaporized helium is warmed by the heat transmitted through the outer enclosure, formed by the outer shell and the thermal shield, thereby cooling the thermal shield. With such a system, most of the heat transmitted through the outer enclosure is intercepted, thus permitting only a relatively small portion of the heat transmitted through the outer enclosure to enter the inner vessel. Due to the high specific heat of helium vapor in comparison to the latent heat of vaporization of liquid helium, this is a remarkably efficient method of restricting the amount of liquid helium that need be evaporated to carry off the heat passing across the thermal shield. By using such an insulating system to contain liquefied helium, not over 10% of the heat reaching the thermal shield will usually be transmitted to the inner vessel.

The term "opacified insulation" as used herein refers to a two-component insulating system comprising a low heat conductive, radiation permeable material and a radiant heat impervious material which is capable of reducing the passage of infrared radiation rays without significantly increasing the thermal conductivity of the insulating system.

One embodiment of this invention contemplates a refrigeration chamber that defines a refrigerated space, within which small components may be readily placed and removed, and which is immersed in a stored body of liquefied helium. The helium surrounding the immersed refrigerant space is contained within a double-walled vacuum-insulated storage vessel having a thermal shield as described above. Another embodiment provides such a refrigeration chamber which comprises an extended portion of the double-walled, vacuum-insulated storage container. In this embodiment, the refrigeration chamber is provided in indirect thermal relationship with the stored liquefied helium body and is readily accessible by means extending through the helium body. The outer enclosure, formed by the outer shell of the container and the thermal shield, and the inner enclosure, formed by the thermal shield and the inner vessel, encompass that section of the refrigeration chamber which protrudes into the aforementioned extended portion of the container.

While the embodiments of the invention to be subsequently described are primarily intended for use in an upright position and are so depicted in the figures, a container having a refrigerated space according to this invention may be constructed which is capable of operation in any position. Also, it is contemplated that a container having multiple refrigerated spaces, independent of one another, may be constructed without departing from the scope of this invention.

With particular reference to FIG. 1, a liquefied gas storage vessel 10 is preferably supported within a thermal shield 12 principally by an access conduit 14. Access conduit 14 enters double-walled, vacuum-insulated storage container 16 through a first end of outer shell 18 and extends into inner vessel 10. Low heat conductive plug 21 covers the outer end of access conduit 14. Refrigeration chamber 19 defining refrigerated space 20, at the end of access conduit 14 opposite the above-mentioned first end of container 16, is so positioned as to place refrigerated space 20 in indirect thermal contact with a refrigerant body stored within inner vessel 10.

Thermal shield 12 is preferably located nearer inner vessel 10 than outer shell 18, and ideally as close as possible without touching the inner vessel. This location of thermal shield 12 permits fabrication of container 16 with minimum outer dimensions. Thermal shield 12 is preferably supported principally by access conduit 14, although some degree of lateral support may be provided by the insulation.

Inner vessel 10 is preferably insulated from heat inleak by placing an opacified insulation within outer enclosure 23 formed by outer shell 18 and thermal shield 12. In the preferred embodiment of this invention the opacified insulation employed is described more fully in U.S. application Serial No. 597,947, filed July 16, 1956, now U.S. Patent No. 3,007,596, in the name of L. C. Matsch. It might comprise, for example, alternate parallel layers of a heat reflective foil such as aluminum separated by means of sub-micron glass fiber paper or mat. This insulation is preferably wrapped around thermal shield 12 and substantially completely fills the aforementioned outer enclosure formed by outer shell 18 and thermal shield 12. Best insulating performance is obtained when the insulating space between outer shell 18 and thermal shield 12 as well as the space between thermal shield 12 and inner vessel 10 is evacuated to a pressure less than about 25 microns of mercury.

An alternate insulating material which may be employed is the opacified powder-vacuum type described more fully in U.S. Patent No. 2,967,152, issued January 3, 1961, in the name of L.C. Matsch which might comprise, for example, equal parts by weight of copper flakes and finely divided silica. The latter material has a very low solid conductivity value but is quite transparent to radiation. The copper flakes serve to markedly reduce the radiant heat inleak.

While the inner enclosure 24 formed by thermal shield 12 and inner vessel 10 may be filled with the powder-vacuum type of opacified insulation or evacuated independently of the aforementioned outer enclosure, such inner enclosure 24 is preferably only evacuated, along with outer enclosure 23, to a common low vacuum of below about 25 microns of mercury. In this preferred arrangement, the highly polished surfaces of thermal shield 12 and inner vessel 10, in combination with the evacuated inner enclosure 24, serve to insulate inner vessel 10 from thermal shield 12. Adsorbent material 22 such as silica gel or sodium zeolite A is located within blister 27 attached to a lower portion of inner vessel 10 to assist in preserving the low vacuum pressure by removing air-water traces.

Vapor conducting conduit 26 is connected to the upper end of inner vessel 10 thereby communicating with the refrigerant body vapor space and preferably extends from the upper end of inner vessel 10 through the inner enclosure 24 to the bottom of inner enclosure 24. Conduit 26 is then attached to the surface of thermal shield 12 in the form of serpentine coils beginning at the lower end of inner enclosure 24 and is connected to access conduit 14 at the upper end of inner enclosure 24 thereby permitting the evaporated gas to refrigerate thermal shield 12 and inner enclosure 24. As shown in the exploded view of FIGURE 1*a*, inner enclosure 24 is sufficiently large to accommodate the serpentine coil of conduit 26 and flattened section **26*a* of conduit 26 which extends from the upper end of inner enclosure 24 to the lower end thereof. Neither flattened section 26*a* nor the serpentine coils touch inner vessel 10 and consequently there is no direct heat leak path between the side walls of thermal shield 12 and inner vessel 10. Inner enclosure 24 and thermal shield 12 are preferably cooled to a low temperature such as, for example, the temperature of liquefied nitrogen at atmospheric pressure; such vaporized gas being preferably warmed to at least 0° C. before being conducted to the atmosphere surrounding container 16 through the upper end of access conduit 14**.

Evaporating gas from the refrigerant body contained in inner vessel 10, caused both by heat from small component 25 stored in refrigerated space 20 and by heat leak from the ambient atmosphere, is withdrawn through conduit 26. Conduit 26 preferably has a flattened section **26*a*, between inner vessel 10 and thermal shield 12, which facilitates the placing of thermal shield 12 in close proximity to inner vessel 10. The gas, withdrawn through conduit 26, is preferably conducted directly to the bottom of the inner enclosure 24 from which the gas is conducted in heat exchange relationship with thermal shield 12, such as by attaching conduit 26 to thermal shield 12 in the shape of a serpentine coil, to the atmosphere. Conduit 26 preferably conducts the superheated vapor from thermal contact with thermal shield 12 into access conduit 14 at a point 28 between the connection of thermal shield 12 with the access conduit, and the connection of inner vessel 10 with the access conduit. The vapor released into access conduit 14 at this point will be conducted to the atmosphere and thereby cool that portion of access conduit 14 nearest the first end of container 16 and also any member connecting to component 25 passing therethrough. If plug 21 is fitted gas-tightly into access conduit 14 and provided with a vapor release valve of a type well-known to the art, the pressure within access conduit 14 may be varied by adjusting the vapor release valve. By varying the pressure within access conduit 14**, the temperature of the component therein may be controlled within limits.

Atmospheric heat is conducted into the inner vessel through access conduit 14 as well as through any member connecting components 25 with component exterior to access conduit 14. It is desirable to intercept a portion of this conducted heat by means of heat exchange with the vapor released into access conduit 14. It is a feature of this invention to utilize the additional vapor produced by cooling component 25 to not only enhance the insulation effect provided by thermal shield 12, but also to provide additional refrigeration effect which can be used to reduce this heat inleakage associated with access conduit 14 and the members connecting component 25. This may be accomplished by low-heat conductive plug 21 or special arrangements within the members connecting component 25, such as baffles, to promote heat exchange therein.

In order to use the refrigerating effects of this released vapor most effectively, the vapor should be released into a section of access conduit 14 at which the temperature is substantially the same as that of the released vapor.

More particularly, thermal shield 12 should be maintained at a temperature such that the temperature difference between thermal shield 12 and inner vessel 10 is not greater than 50% of the temperature difference between outer shell 18 and inner vessel 10, and preferably within the range of 2–40%. Because the emissivity of the thermal shield is a function of the temperature, it is necessary to maintain the evacuated space within the inner enclosure at a low temperature in order to reduce the amount of radiant heat energy, passing through such enclosure, to an acceptable value. It has been found that by maintaining the temperature difference between thermal shield 12 and inner vessel 10 below about 50% of the temperature difference between outer shell 18 and inner vessel 10, the emissivity factor is held within relatively low limits. The flattened portions **26*a* of conduit 26, which allow thermal shield 12 to be placed in close proximity to inner vessel 10, enable thermal shield 12** to be highly effective in intercepting heat inleak so that evaporation loses of the helium refrigerant, caused by ambient heat inleak, are restricted to less than about 5% of capacity per day. Of course, internally generated heat would increase the vaporization loss by an amount corresponding to the increase of total heat input.

Liquid refrigerant filling and withdrawal are accomplished through fill-discharge conduit 30 located within vessel 10 and preferably extending in close proximity with the end of vessel 10 opposite the first end of container 16. In the preferred embodiment, fill-discharge conduit 30 is coiled, as shown generally at 32, within the inner enclosure to allow for contraction and also to reduce heat transfer from the ambient atmosphere into the refrigerant body.

A further reduction in heat inleak is obtained by the novel manner in which both access conduit 14 and fill-discharge conduit 30 are connected to inner vessel 10 due to the markedly increased heat transfer path achieved. Extended portions 34 and 36 of inner vessel 10 concentrically enclose conduits 14 and 30, respectively, and are of sufficient diameter to form an annular space therebetween. The end of extended portions 34 and 36 are leak-tightly joined to conduits 14 and 30 at 38 and 40 respectively, thereby forming respective evacuated extensions 42 and 44 of the inner enclosure. The joint 38 of access conduit 14 with inner vessel 10 also provides a first end connection which supports vessel 10. Lateral support means 46, for example in the form of rods, may provide further support of vessel 10, if required during shipment and handling. Refrigerated space 20, at the second end of access conduit 14, extends beyond joint 38 into the refrigerant body and fill-discharge conduit 30 extends beyond joint 40.

The embodiment depicted in FIG. 2 is similar in most respects to that shown in FIG. 1 except for the extension of access conduit 14 through the end of inner vessel 10 opposite the first end of container 16. This extension places refrigerated space 20 within an extended portion 50 of the inner enclosure. The second end of container 16 is deformed to provide tail section 52 enclosing that section of access conduit 14 extending beyond inner vessel 10. Tail section 52 includes the inner enclosure extension 50 an outer enclosure extension 54 of the outer enclosure and thermal shield extension 56.

This construction of refrigerated space 20 is especially suitable for containing a maser crystal unit 25. Such unit employs a surrounding field magnet which is readily positioned by placing it in close proximity with tail section 52. Since the temperature of the maser unit within refrigerated space 20 in tail section 52 must be maintained as near to the temperature of the refrigerant body as possible, special conducting means such as heavier walls for the extended portion of access conduit 14 are preferably employed to refrigerate the maser unit. Furthermore, since the optimum operation of the maser unit is obtained with minimum spacing between the cold temperature core unit and the ambient temperature external magnetic field, minimum space is therefore available for the outer insulation enclosure within tail section 52. Therefore, extreme care must be taken to limit the heat inleak to a tolerable level across this narrow space having a very large temperature differential, on the order of 270° F.

Although preferred embodiments of the invention have been described in detail, it is contemplated that modifications of the apparatus may be made and that some features may be employed without others, all within the spirit and scope of the invention.

What is claimed is:

1. In a component refrigerating container comprising a liquefied gas refrigerant inner vessel, an exterior shell surrounding the inner vessel so as to form an evacuable space therebetween, a vapor-refrigerated thermal shield situated between said exterior shell and said inner vessel, inner vessel vapor venting means, inner vessel liquefied gas fill-withdrawal means, and means for supporting said thermal shield and said inner vessel within said exterior shell, the combination therewith of: an access conduit connected to said exterior shell and extending across said evacuable space into the interior of said inner vessel; an inwardly extending portion of said inner vessel concentrically enclosing a section of said access conduit and leak-tightly joined thereto so as to form an extension of said evacuable space therebetween; a component-refrigerating chamber connected to said access conduit within the interior of said inner vessel and extending beyond the joint between the inner vessel extended portion and said access conduit.

2. A component refrigerating container according to claim 1 wherein said access conduit extends leak-tightly through said inner vessel; and wherein the container includes outwardly extending portions of said exterior shell comprising a tail section and said thermal shield, being so constructed and arranged as to receive the refrigeration chamber connected to said access means.

3. A component refrigerating container according to claim 1 wherein opacified insulation material is contained within said evacuable space.

4. A component refrigerating container according to claim 3 wherein said opacified material comprises alternate parallel layers of radiation reflective barrier material separated by low heat conductive fibrous material, such insulation being wrapped around said thermal shield.

5. A component refrigerating container according to claim 3 wherein the opacified insulation material comprises a mixture of finely divided low thermally conductive particles and finely divided radiant heat reflective particles.

6. A component refrigerating container according to claim 1 wherein said thermal shield is located in close proximity to said inner vessel such that the temperature difference between said thermal shield and said inner vessel is less than about 50% of the temperature difference between said exterior shell and said inner vessel.

7. A component refrigerating container according to claim 6 wherein said vapor venting means is attached to the inner surface of said thermal shield and extends from a first end of said inner vessel to a second end thereof and thereafter spirally upward between the walls of said inner vessel and said thermal shield.

References Cited in the file of this patent

UNITED STATES PATENTS

| | | |
|---|---|---|
| 1,976,688 | Dana et al. | Oct. 9, 1934 |
| 2,513,749 | Schilling | July 4, 1950 |
| 2,816,232 | Burstein | Dec. 10, 1957 |
| 2,863,297 | Johnston | Dec. 9, 1958 |

| | | |
|---|---|---|
| 2,907,177 | Daley et al. | Oct. 6, 1959 |
| 2,927,437 | Rae | Mar. 8, 1960 |
| 2,951,348 | Loveday et al. | Sept. 6, 1960 |
| 2,967,961 | Heil | Jan. 10, 1961 |
| 2,970,452 | Beckman | Feb. 7, 1961 |
| 2,986,891 | McMahon | June 6, 1961 |
| 3,066,222 | Poorman et al. | Nov. 27, 1962 |

OTHER REFERENCES

Publication—"Advance in Cryogenic Engineering," volume 4, (Timmerhaus), published by Plenum, 1960 (Published Report of September 3–5, 1958) pages 426–435 relied on.